(12) United States Patent
Markun

(10) Patent No.: US 10,827,741 B1
(45) Date of Patent: Nov. 10, 2020

(54) AVIAN DETERRENT DEVICE

(71) Applicant: Keith Thomas Markun, Minneapolis, MN (US)

(72) Inventor: Keith Thomas Markun, Minneapolis, MN (US)

( * ) Notice: Subject to any disclaimer, the term of this patent is extended or adjusted under 35 U.S.C. 154(b) by 0 days.

(21) Appl. No.: 15/861,419

(22) Filed: Jan. 3, 2018

(51) Int. Cl.
*A01M 29/08* (2011.01)
*A01M 29/10* (2011.01)

(52) U.S. Cl.
CPC ............ *A01M 29/08* (2013.01); *A01M 29/10* (2013.01)

(58) Field of Classification Search
CPC ...... A01M 29/08; A01M 29/10; A01M 29/00; A01M 29/06; A01M 29/32; Y10T 428/216; Y10T 428/24231; B44C 5/0446; A63H 33/40
USPC .......................................................... 52/101
See application file for complete search history.

(56) References Cited

U.S. PATENT DOCUMENTS

| | | | | |
|---|---|---|---|---|
| 1,981,696 A | * | 11/1934 | Harper | B44C 5/00 59/80 |
| 2,722,195 A | * | 11/1955 | Rockafeller | A01M 29/06 116/22 A |
| 3,221,440 A | * | 12/1965 | Gutierrez | A63H 33/40 446/201 |
| 3,436,882 A | * | 4/1969 | Keefe | A01M 29/16 52/101 |
| D250,455 S | * | 12/1978 | Mohrhauser | D10/116.1 |
| 4,597,357 A | * | 7/1986 | LeMessurier | A01M 29/08 116/22 A |
| 4,850,798 A | * | 7/1989 | Bailey | F03D 1/0608 416/11 |
| 5,702,781 A | * | 12/1997 | Barker | A47G 33/08 40/617 |
| 5,918,404 A | * | 7/1999 | Ohba | A01M 29/32 116/22 A |
| 6,003,471 A | * | 12/1999 | Ohba | A01M 29/26 119/713 |
| 6,298,609 B1 | * | 10/2001 | Bifano | E04B 1/765 52/101 |
| 6,807,765 B2 | * | 10/2004 | Watermann | A01M 29/06 43/2 |
| 7,874,093 B2 | * | 1/2011 | Rohrke | A01M 31/06 43/2 |
| 7,930,989 B2 | | 4/2011 | Dory, III et al. | |
| 8,402,685 B1 | * | 3/2013 | Marshall | A01M 31/06 43/2 |
| 8,479,678 B1 | * | 7/2013 | Sandoval | A01M 29/08 116/22 A |
| D701,936 S | | 4/2014 | Kotze | |
| 8,869,732 B1 | * | 10/2014 | Chervick | A01M 29/08 116/22 A |
| 2007/0137883 A1 | * | 6/2007 | Naidoo | H02G 7/00 174/138 F |
| 2017/0347641 A1 | * | 12/2017 | Giangrasso | A01M 29/08 |

FOREIGN PATENT DOCUMENTS

| CA | 2178512 A1 * | 12/1997 | ............ A01M 29/00 |
|---|---|---|---|
| WO | 2010135771 A1 | 12/2010 | |

\* cited by examiner

*Primary Examiner* — Brian E Glessner
*Assistant Examiner* — James J Buckle, Jr.
(74) *Attorney, Agent, or Firm* — William R Berggren; Berggren Law Offices LLC

(57) ABSTRACT

A simple effective avian deterrent device comprising swivels rotationally affixed to a sturdy form and having at least two differently sized panels, each panel having images on both surfaces.

20 Claims, 3 Drawing Sheets

AVIAN DETERRENT DEVICE

FIELD OF THE INVENTION

This invention relates to devices to deter avian creatures, in particular, woodpeckers and bats, from damaging the sides of sturdy forms such as buildings.

BACKGROUND OF THE INVENTION

Birds can cause damage to the siding of houses and other structures. Woodpeckers, in particular, can cause damage that includes, making holes in siding in search of food, nesting, or attracting mates. Bats may also be a nuisance.

Present deterrent devices have limited use. They either require frequent changes or protect a limited area.

There is a need for a simple deterrent device that protects more area for longer times.

SUMMARY OF THE INVENTION

The invention protects an area from woodpeckers and other avian creatures for at least a distance of 10 feet from the device and for a time of at least 1 month. The avian deterrent device comprises a first swivel, a first panel, a second swivel, and a second panel. The first swivel is a ball bearing swivel and is rotationally affixed to a sturdy form. The first panel is rotationally affixed to the first swivel. The first panel includes a top, a bottom, a first size, a first side with a surface area, a second side with a surface area, and a support sheet. The support sheet includes a first side surface with a first image, a second side surface with a second image, and a body portion occupying a perpendicular plane. The support sheet also includes a first side edge that has a first surface and a second surface and is configured to extend in one direction from the perpendicular plane at an angle sufficient to be able to catch enough wind to result in spinning of the panel in wind of more than 3 mph. The support sheet also includes a second side edge. The second swivel is a ball bearing swivel and is rotationally affixed to the bottom of the first panel. The second panel is rotationally affixed to the second swivel and includes a second size that is smaller than the first size, first side with a surface area, a second side with a surface area, a top with a first surface and a second surface, and a configuration able to rotate also in other than a perpendicular manner, the first side having a third image and the second side having a fourth image.

A method is also provided for using an avian deterrent device. The method comprises providing the avian deterrent device described above. The first end of the support element of the device is affixed to the side of a building where avian deterrence is desired.

The invention is a durable and effective deterrent to such diverse avian nuisances as woodpeckers and bats. The device presents various visual images in a random matter with the second panel of the invention often moving more erratically than the first panel. It can work satisfactorily with light winds with speeds of about one to three miles per hour (mph) for over 30 days without external adjustments or replacements and even when left outside in the wind and rain of a hurricane. Deterrence is accomplished over a distance of at least ten feet from the device. In addition, some embodiments have deterrence features during dawn and dusk conditions and even during night time conditions if external lighting is present.

BRIEF DESCRIPTION OF THE DRAWINGS

One or more features or preferred forms of the invention are described in the accompanying drawings. The drawings are described briefly below.

Figure 1:
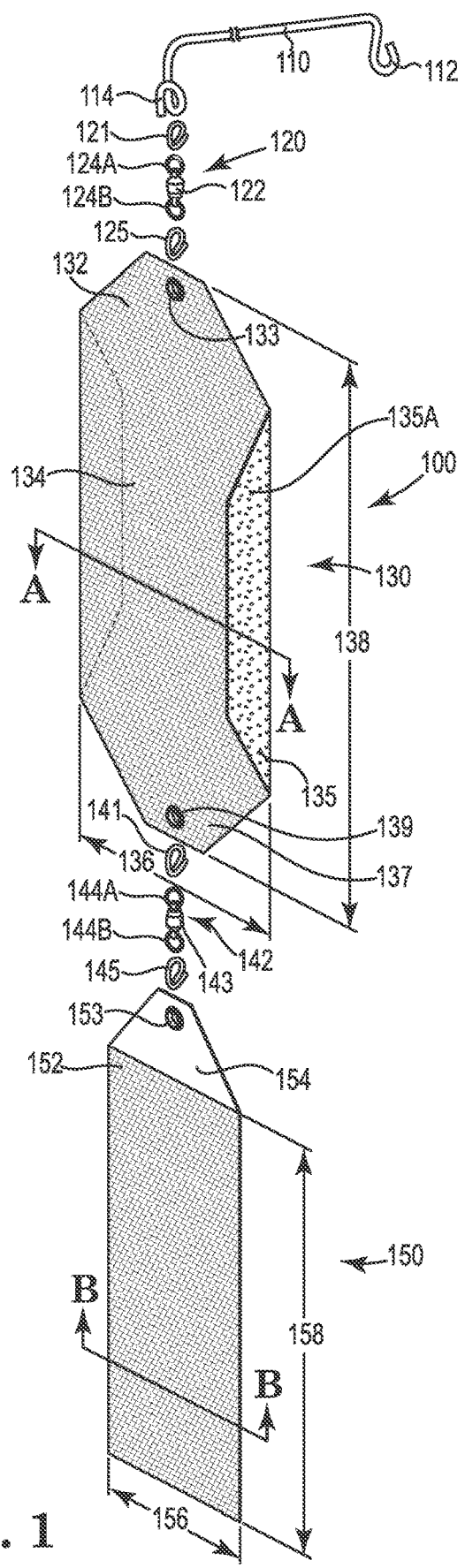
FIG. 1 is a perspective view of an exploded view of an embodiment of the apparatus.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

Avian creatures can cause damage to the siding of houses and other structures. Woodpeckers, in particular, can cause damage that includes, making holes in siding in search of food, nesting, or attracting mates. Bats may also be undesirable nuisances.

Other known avian deterrent devices have limited use. They either require frequent changes or protect a limited area. Some are too close to a building or other sturdy form; thus, limiting the effective range of the deterrence to only a few feet from the device. Others are unable to rotate easily under low wind speed to present random visual images over a desired length of tome under mild weather. Others are not durable enough to withstand strong weather conditions up to those of hurricane force winds and rain and still function satisfactorily when weather is normal. There is a need for a simple deterrent device that protects more area for longer time and is durable.

The invention is both effective over a large area and is durable. The two-part system of different sizes of holographic rotating elements allow the bottom part to spin in little to almost no wind, and the top part to spin in medium to heavy winds. The light weight nature of the bottom of some embodiments additionally causes the bottom to move in a manner other that just rotating in a perpendicular manner. This further shows strong visual randomness that is effective in deterring avian nuisances. In addition, the invention is effective against other wild life such as, for example, deer and rabbits.

The avian deterrent device comprises a first swivel, a first panel, a second swivel, and a second panel. The first swivel is a ball bearing swivel that can have a first affixing end and a second affixing end. It is configured to be affixed to a sturdy form such as, for example, a side of a building or a tree. The ball bearing swivel is configured to allow the avian deterrent device to rotate under wind with a speed of at least three mph on the device. It is also durable. In some embodiments the swivel can have a test strength, like a fishing lure test strength, of at least 100 pounds (lbs.) allowing for satisfactory use in heavy winds with speeds of over 20, 30, 40, 50, and 60 mph and endurance in winds with speeds of over 80, 90, and 100 mph without being pulled apart. The high rating permits the invention to not pull apart under force of high winds. The higher the test rating the longer and more efficiently a swivel will work. In some embodiments, the swivel can have a test strength of at least 140 lbs., 160 lbs., 180 lbs., and 200 lbs. to allow for endurance under winds with speeds of over 90, 100, 110, and 120 mph. A suitable swivel for some embodiments is a stainless-steel ball bearing swivel like Item Number 4212 #5 ringed ball bearing swivel from Lure Parts Online, Inc., Springfield Ill. 62704 that is rated at 200 lbs.

The first affixing end is configured to attach to a sturdy form. Such a form may be, for example, a tree, the side of a building or some other sturdy form near where deterrence of avian creatures is desired. In some embodiments, the first affixing end can be affixed to a wire suspended to one form such as a tree and its branches or between two forms, such as, for example, two trees, a structure and a a tree. In some embodiments the affixing is accomplished by use of rings.

In some embodiments, the first affixing end can be affixed to a support element that is in turn affixed to a sturdy form. The support element can have a first end configured to affix to a sturdy form such as the side of a building, a second end configured to extend outward from the side of a building, and a length far enough from the sturdy form where it is mounted to permit some rotation of at least part of the avian deterrent device under wind speeds of one mph and not enough to permit sagging of the structure below horizontal when the support element is mounted horizontally from a sturdy form such as the side of a building. In some embodiments the length can be enough to permit maximum exposure to available sunlight. In some embodiments the length can be sufficient to permit viewing of avian nuisances from at least 10 feet away from the mounting point In some embodiments the length can be sufficient to permit viewing of over 20 feet distance. This distance depends on such things as distance of an overhang of a roof above a mounting site of the first affixing end and the strength of the material used for the support element. In some embodiments the length can be over 12 inches and under 40 inches. In some embodiments, the length can be over 14 inches and under 30 inches. In some embodiments, the length can be over 15 inches and under 25 inches. In some embodiments the support element can be a stainless-steel rod.

The first panel is rotationally affixed to the first swivel at its second affixing end. The first panel includes a top, a bottom, a first size, a first side with a surface area, a second side with a surface area, and a support sheet. The support sheet includes a first side surface with a first image, a second side surface with a second image, and a body portion occupying a perpendicular plane.

Images are designed to present bright, flashing, random scenes to deter avian creatures from an area around the avian deterrent device. Reflective images such as those on reflective adhesive-backed sheet are one way to achieve such varied visual scenes from the avian deterrent device as it rotates. Some embodiments can achieve such imaging through use holographic adhesive-backed sheets on at least some of the surfaces of the panels. One useful holographic adhesive-backed sheet is similar to holographic tape listed as color card identification numbers 121, 981 and 1028 from WTP INC., Coloma, Mich. 49038. The images vary under light more randomly that merely reflective tapes. In some embodiments, the images further can have sections of glow-in-the-dark strips affixed to the image to add further visual distortions to the first panel even after sunlight begins to fade. Some embodiments can use exterior grade glow-in-the-dark adhesive tape rated at 24-hour glow time for low light and night time use of the avian deterrent device.

Some embodiments can use images that are affixed to the support sheet of the first panel or affixed together to form the second panel by means other than adhesives. Images may be affixed to the support sheet or each other by known method such as adhesion through use of mechanical fasteners or direct affixing through such methods known to the art as, for example, sonic welding, heat welding, or other forms of radiation welding.

The support sheet also includes a first side edge that has a first surface and a second surface, and is configured to extend in one direction from the perpendicular plane at an angle sufficient to be able to catch enough wind to result in spinning of the panel in wind of more than 3 mph. The support sheet also includes a second side edge.

In some embodiments, the second side edge of the first panel can comprise a first surface and a second surface and can be configured to extend in the opposite direction from the perpendicular plane at an angle of between 20 degrees and 90 degrees. This construction more effectively catches wind that in turn causes the avian deterrent device to rotate, generally about a perpendicular axis or frame of reference.

In some embodiments, the support sheet of the first panel can be made of a metal that is resistant to rusting, light weight, and easy to bend but tough enough to prevent swivels from tearing from the top and bottom ends of the panel. Such metals include, for example, galvanized steel sheeting having a thickness of between 5 and 10 thousandths of an inch and aluminum sheeting having a thickness of between 5 and 15 thousandths of an inch. Plastic sheets having a thickness of 10 to 20 thousandths of an inch may also be suitable if they were able to bend and retain the bent form under use conditions. In some embodiments, the sheet can be cut into a diamond shape and bent at angles on the two sides to allow wind to catch and spin effortlessly.

In some embodiments, holographic adhesive-backed sheets with different images can be affixed to each side of the sheet before bending of at least one end. In some embodiments the images are the same for each side.

The second swivel is a ball bearing swivel that can have a first affixing end and a second affixing end and is affixed with the first affixing end affixed to the bottom of the first panel. This swivel is similar to that discussed earlier.

The second panel is rotationally affixed to the second swivel at its second affixing end and includes a second size that is smaller than the first size, a first side with a surface area, a second side with a surface area, a top with a first surface and a second surface, and a configuration able to rotate also in other than a perpendicular manner. The first side has a third image and the second side has a fourth image. In some embodiments, the second panel can comprise two reflective adhesive-backed plastic sheets affixed together with one adhesive side facing the other adhesive side. In some embodiments, the adhesive-backed plastic sheets can have at least one holographic reflective image. In some embodiments both sides are holographic, and the holographic images of each sheet are different. In some embodiments, only one of the image sheets can be adhesive-backed and the other is not.

In some embodiments the top and bottom of the first panel and the top of the second panel can have a metal circle like a grommet embedded to provide a tear resistant opening for the ends of each swivel to affix.

Imaging may vary. In some embodiments, at least two of the images can be reflective. In some embodiments at least two of the images can be holographic. In some embodiment the four images can be different. In some embodiments only two or three of the images can be different.

In some embodiments, connectors can be used to connect the outer ends of the swivels with the support element, first panel or second panel to further increase easy of rotation of the device in wind. The connector can be an elongated structure such as a metal rod that is contorted into a closed orientation that may be in the shape of a circle, a tringle, or other shape. The connector may be of metal, or plastic as long as it is satisfactorily durable under use conditions of the invention. A first connector may be connected to the second end of the support element and the first end of the first swivel. A second connector may be connected to the second end of the first swivel and a grommet affixed to the top of the first panel. The third connector may be connected to a grommet affixed to the bottom of the first panel and the first end of the second swivel. A fourth connector may be connected to the second end of the second swivel and a grommet affixed to the top end of the second panel.

The second size of the second panel is smaller than the first size of the first panel. This allows the two panels to move in more erratic and therefore deterrent manners than if both were the same size. The support sheet in the first panel and not in the second panel results in the first panel being heavier than the second panel even if the surface area of each panel is the same. Size may be valued by weight or may also, in some embodiments, be valued or augmented by surface area. In some embodiments the surface area of each panel can be different and in some it can be the same. In some embodiments the surface area of each side of the first panel can range from 20 square inches to 40 square inches. First a panel with a smaller surface area tends not to rotate as freely for some embodiments because of less wind caught and a larger surface area tends to not rotate as freely because it is heavier than desired. In some embodiments surface area of each side of the second panel can range from 8 square inches to 25 square inches. Likewise, second panels with smaller and larger surface areas tend not to rotate as freely as desirable for some embodiments. More differences in size between the first panel and the second panel can result in more erratic behavior of the device and result in more deterrent effects for some embodiments.

Because of the support sheet providing more firmness and weight to the first panel than the second panel that contains no support, the two panels move differently when exposure to wind. The first panel tends to move in a rotation manner and at exposure to wind of a higher speed. Typically, wind should be at least 3 mph for the first panel to rotate. In addition, the first panel will largely rotate even as the wind speed increases to winds of such higher speeds, such as winds over 10, 20, 30, 40, 50, and 60 mph. The second panel, being lighter, tends to rotate much more easily at wind speeds of as low as one mph. At higher speeds such as over 5. 10, 20, and 30 mph, the rotational movement tends to become even more random and erratic, beyond that of a uniform rotation about a perpendicular orientation. Thus, in some embodiments of the avian deterrent device, the two panels with different weights, firmness and in some cases surface area can cause the second panel to spin in little to almost no wind, and the first panel to spin in medium to heavy winds, causing both panels to move differently, erratically, and randomly to create a very strong visual deterrent to avian creatures. This random and erratic movement combined with the varied visual images provide an effective deterrent to avian nuisances. The glow-in-the-dark elements of some embodiments extend the effective deterrence of the device into low light and no light conditions. Some embodiments may have glow-in-the-dark elements, such as, for example glow-in-the-dark adhesive-backed sheets, on the top of the second panel and on one or more of the inside surfaces of the side edges of the first panel. Some embodiments may have glow-in-the-dark elements elsewhere also or in addition.

The avian deterrent device may be better understood by viewing various figures showing one embodiment of the invention.

FIG. 1 is a perspective view of an exploded view of an embodiment of the apparatus. An avian deterrent device 100 is shown with a support element 110 having a first end 112 configured to attach to a sturdy form, the side of a structure, and a second end 114 configured to attach to a first connector 121. A first swivel 120 is shown with a ball bearing center 122, a first end 124A, and a second end 124B. The first end 124A is configured to attach also to the first connector 121. The second end 124B is configured to attach to a second connector 125. A first panel is shown with a top 132, with a grommet 133 configured to attach to the second connector 125, a first side 134 with a first image, a second side 135 with a second image, a width 136 and a height 138. It also has a first side edge 135A bent away from the main body and a bottom 137 with a second grommet 139 configured to attach to a third connector 141. A second swivel 142 with a ball bearing center 143 and a first end 144A is configured to attach also to the third connector 141. A second end 144B is configured to attach to a fourth connector 145 that is in turn configured to attach to a second panel 150 at its grommet 153. The second panel has a third image 152 attached to a second image (not shown). It also has a top covered with glow-in-the-dark element 154 and a body with a width 156 and a height 158.

Figure 2:
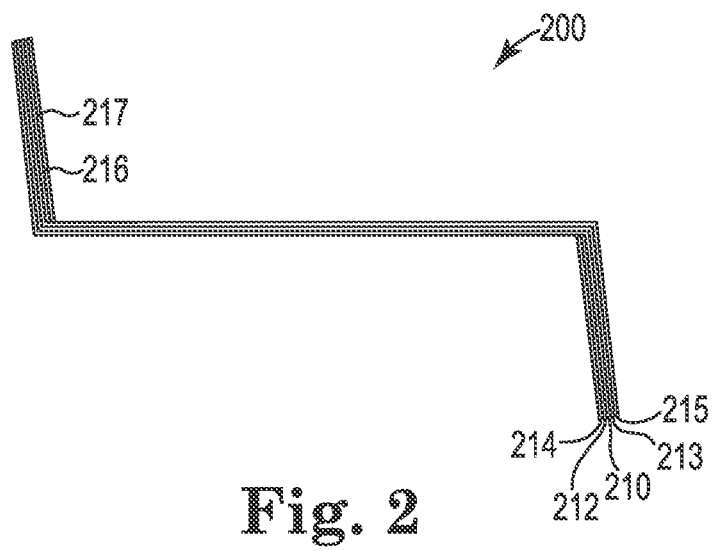
FIG. 2 is a side view of a cross-section of the first panel of the device shown in FIG. 1.

FIG. 2 is a side view of a cross-section A-A viewed looking down of the first panel of the device shown in FIG. 1. The first panel 200 is shown with a support sheet layer 210, a first adhesive layer 212, and a second adhesive layer 213, a first image layer 214 and a second image layer 215. Also shown is a third adhesive layer 216 and a glow-in-the-ark element 217 along the inside side edge.

Figure 3:
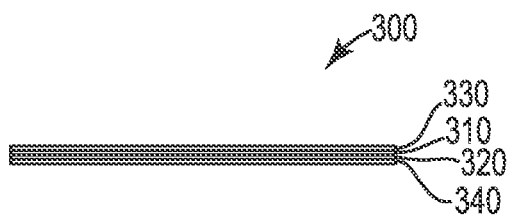
FIG. 3 is a side view of a cross-section of the second panel of the device shown in FIG. 1.

FIG. 3 is a side view of a cross-section B-B viewed looking up the second panel 300 of the device shown in FIG. 1. Two adhesive backed image sheets touching. The fourth adhesive 310 contacts the fifth adhesive layer 320. The third image layer 330 contacts the fourth adhesive layer 310 and the fourth image layer 340 contacts the fifth adhesive layer 320

A method is also provided for using an avian deterrent device. The method comprises providing the avian deterrent device described above. The first end of the swivel is affixed to as sturdy form where avian deterrence is desired. The placement is important to achieve maximum exposure to sunlight and wind while being proximate to the site where avian deterrence is most desired.

In some embodiments the deterrence effect can be satisfactory for up to 10 feet from the avian deterrent device.

In some embodiments, the deterrence effect can be satisfactory for up to 20 feet from the avian deterrent device.

In some embodiments the deterrent device can be configured to withstand inclement weather of a class 1 hurricane and still function satisfactorily when weather is clear.

In some embodiments the deterrent device can be configured to deter avian creature presence for at least 30 days without adjustments.

Figure 4:
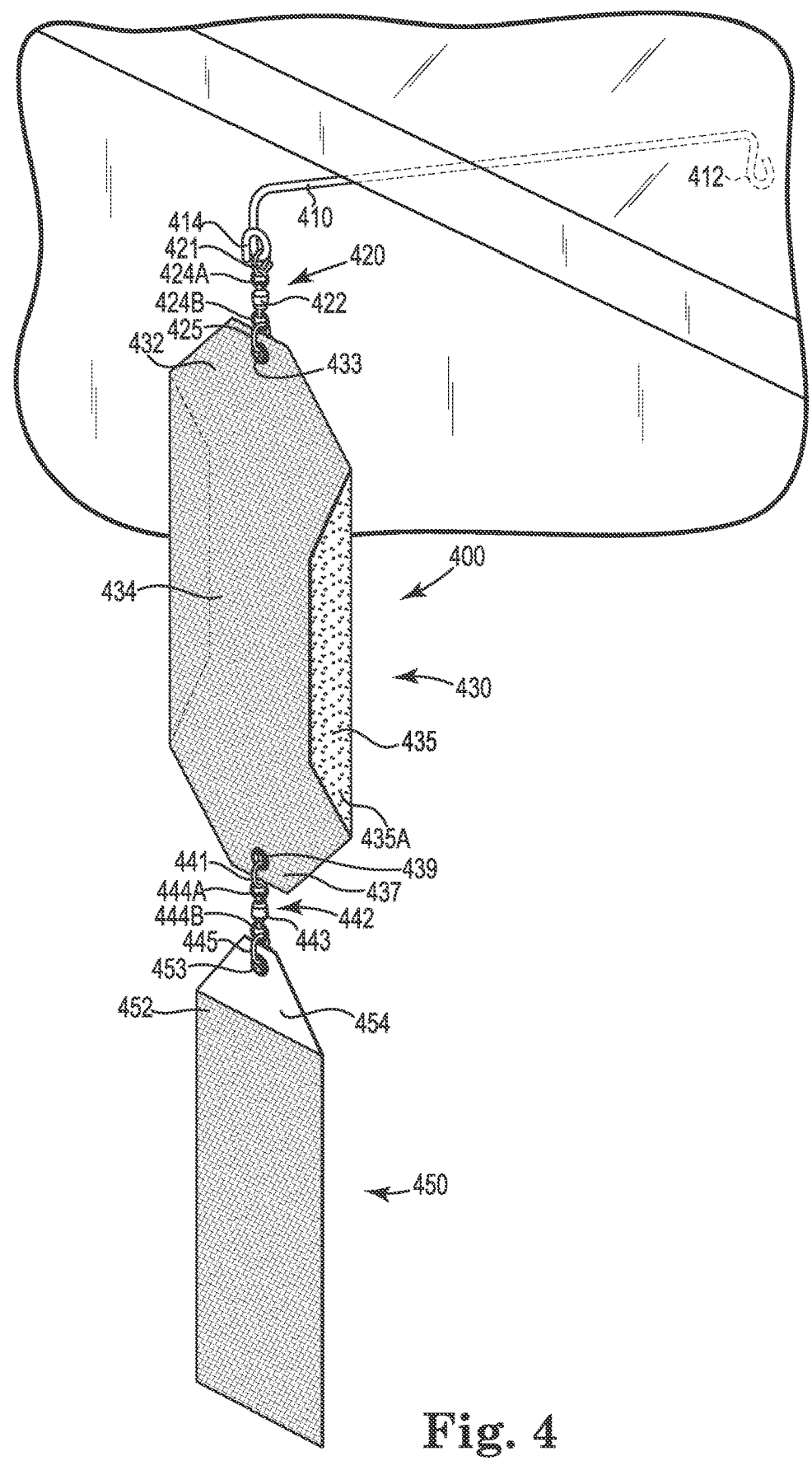
FIG. 4 is a perspective view of the embodiment shown in FIG. 1 assembled and affixed to the side of a building.

The method of use may be further understood by use of a figure. FIG. 4 is a perspective view of the embodiment shown in FIG. 1 assembled and affixed to the side of a sturdy form, in this case a building. The support element extends the reflective panels out beyond the eves of the structure. The reflective panels are free to rotate and move otherwise in various wind conditions. Specifically, FIG. 4 is a perspective view of an assembled view of the device shown in FIG. 1. An avian deterrent device 400 is shown with a support element 410 having a first end 412 attach to the side of a structure under a ledge and a second end 414 attached to the rest of the avian deterrent device. A first swivel 420 is shown with a ball bearing center 422, a first end 424A, and a second end 424B. The first end 424A is attached to a first connector 421. The second end 424B is attached to a second connector 425. A first panel is shown with a top 432, with a grommet 433 attached to the second connector 425, a first side 434 with a first image, and a second side 435 with a second image. It also has a first side edge 435A bent away from the main body and a bottom 437 with a second grommet 439 attached to a third connector 441. A second swivel 442 is shown with a ball bearing center 443, a first end 444A attached also to the third connector 441, and a second end 444B attached to a fourth connector 445 that is in turn attached to a second panel 450 at its grommet 453. The second panel has a third image 452 attached to a second image (not shown). It also has a top covered with glow in the dark element 454.

Other modifications and changes regarding my invention will be apparent to those skilled in the art. The invention is not considered limited to the embodiments chosen for purposes of disclosure and covers all changes and modifications that do not constitute departures from the true spirit and scope of this invention.

I claim:

1. An avian deterrent device comprising: a first swivel comprising a ball bearing swivel and configured to be rotationally affixed to a sturdy form; a first panel rotationally affixed to the first swivel, comprising a top, a bottom, a first size, a first side layer with a first image and a surface area, a second side layer with a second image and a surface area, and a support sheet having a first side surface affixed to the first side layer with the first image outward and a second side surface affixed to the second side layer with the second image outward, a body portion occupying a perpendicular plane, a first side edge with a first surface, a second surface, and configured to extend in one direction from the perpendicular plane, and a second side edge; a second swivel comprising a ball bearing swivel and rotationally affixed to the bottom of the first panel; and a second panel rotationally affixed to the second swivel, having a second size smaller than the first size, a top with a first surface and a second surface, a configuration able to rotate also in other than a perpendicular manner, a first side layer with a surface area, a front having a third image and a back, and a second side layer with a surface area, a front having a fourth image and a back, wherein the back is in contact with and affixed together with adhesive or mechanical fastener to the back of the first side layer of the second panel or directly by sonic welding, heat welding or radiation welding to the back of the first side layer of the second panel, wherein at least a first or second and a third or fourth image is visually random.

2. The avian deterrent device of claim 1 wherein the second side edge of the first panel comprises a first surface and a second surface and is configured to extend in the opposite direction from the perpendicular plane at an angle of between 20 degrees and 90 degrees.

3. The avian deterrent device of claim 1 wherein at least two images are holographic.

4. The avian deterrent device of claim 1 wherein at least two images are reflective.

5. The avian deterrent device of claim 1 wherein at least the first and second image are different.

6. The avian deterrent device of claim 1 further comprising glow-in-the-dark elements on at least one of the panels.

7. The avian deterrent device of claim 1 further comprising a support element having a first end configured to affix to the first swivel, a second end configured to be affixed to a sturdy form, and a length far enough from the sturdy form where it is mounted to permit maximum exposure to available sunlight and obtain at least some rotation of at least part of the avian deterrent device under wind speeds of one mph and not enough to permit sagging of the structure below horizontal when the support element is mounted horizontally from the side of the form.

8. The avian deterrent device of claim 1 wherein at least one swivel has a test rating of at least 100 lbs.

9. The avian deterrent device of claim 7 wherein the surface area on each side of the first panel is at least 12 square inches and the surface area on each side of the second panel is at least 8 square inches.

10. An avian deterrent device comprising: a support element having a first end configured to affix to the side of a building, a second end configured to extend outward from the side of a building, and a length far enough from the side of a building where it is mounted to permit maximum exposure to available sunlight and some rotation of at least part of the avian deterrent device under wind speeds of one mph and not enough to permit sagging of the structure below horizontal when the support element is mounted horizontally from the side of the building; a first swivel comprising a ball bearing and affixed to the second end of the support element; a first panel rotationally affixed to the first swivel, comprising a top, a bottom, a first size, a first side layer with a first image and a surface area, a second side layer with a second image and a surface area, and a support sheet having a first side surface affixed to the first side layer with the first image outward and a second side surface affixed to the second side layer with the second image outward, a body portion occupying a perpendicular plane, a first side edge with a first surface, a second surface, and configured to extend in one direction from the perpendicular plane, and a second side edge; a second swivel comprising a ball bearing swivel and rotationally affixed to the bottom of the first panel; and a second panel rotationally affixed to the second swivel, having a second size smaller than the first size, a top with a first surface and a second surface, a configuration able to rotate also in other than a perpendicular manner, a first side layer with a surface area, a front having a third image and a back, and a second side layer with a surface area, a front having a fourth image and a back, wherein the back is in contact with and affixed together with adhesive or mechanical fastener to the back of the first side layer of the second panel or directly by sonic welding, heat welding or radiation welding to the back of the first side layer of the second panel, wherein at least a first or second and a third or fourth image is visually random, wherein at least a first or second and a third or fourth image is visually random, wherein at least a first or second and a third or fourth image is visually random.

11. A method of using an avian deterrent device comprising providing an avian deterrent device comprising a first swivel comprising a ball bearing and configured to be rotationally affixed to a sturdy form; a first panel rotationally affixed to the first swivel, comprising a top, a bottom, a first size, a first side layer with a first image and a surface area, a second side layer with a second image and a surface area, and a support sheet having a first side surface affixed to the first side layer with the first image outward and a second side surface affixed to the second side layer with the second image outward, a body portion occupying a perpendicular plane, a first side edge with a first surface, a second surface, and configured to extend in one direction from the perpendicular plane, and a second side edge; a second swivel comprising a ball bearing swivel and rotationally affixed to the bottom of the first panel; and a second panel rotationally affixed to the second swivel, having a second size smaller than the first size, a top with a first surface and a second surface, a configuration able to rotate also in other than a perpendicular manner, a first side layer with a surface area, a front having a third image and a back, and a second side layer with a surface area, a front having a fourth image and a back, wherein the back is in contact with and affixed together with adhesive or mechanical fastener to the back of the first side layer of the second panel or directly by sonic welding, heat welding or radiation welding to the back of the first side layer of the second panel, wherein at least a first or second and a third or fourth image is visually random; and affixing the first swivel of the device to a sturdy form where avian deterrence distance is desired.

12. The method of claim 11 wherein the deterrence distance is at least 10 feet from the device.

13. The method of claim 11 wherein the deterrence distance is at least 20 feet from the device.

14. The method of claim 11 wherein the device is configured to withstand the inclement weather of a class 1 hurricane and still function satisfactorily when weather is clear.

15. The method of claim 11 wherein the device in use deters avian presence for at least 30 days without adjustments.

16. The method of claim 11 wherein the first panel rotates in wind of at least 3 miles per hour.

17. The method of claim 11 wherein the second panel rotates in wind of at least 1 mile per hour.

18. The method of claim 11 wherein the affixing is to a side of a form that is exposed to sunlight at least part of the day when the sun is visible.

19. The method of claim 11 wherein the affixing is to a side of a form that is exposed light during at least part of the night.

20. The method of claim 11 wherein the first swivel and second swivel have a fishing lure test strength of at least 100 pounds allowing for satisfactory use in heavy winds of over 60 mph and endurance in winds of over 100 mph without being pulled apart.

* * * * *